UNITED STATES PATENT OFFICE.

JOHN H. SCHENCK, OF ST. LOUIS, MISSOURI.

IMPROVED MODE OF PREPARING CONCENTRATED FOOD.

Specification forming part of Letters Patent No. 45,180, dated November 22, 1864; antedated July 15, 1863; Reissue No. 1,945, dated May 2, 1865.

*To all whom it may concern:*

Be it known that I, JOHN H. SCHENCK, of St. Louis, and State of Missouri, have discovered a new Mode of Preparing Concentrated Food for Man and Beast; and I hereby declare that the following is a true and exact description of the mode of preparing said food.

The nature of my invention consists in taking ordinary grain of various kinds, with or without other substances, and subjecting it to a process by which its nutritive qualities shall be retained, while the mass is greatly reduced in bulk and weight, whereby it is rendered far more portable, and at the same time can be preserved for a long period without deterioration.

At the present day it is necessary to transport large quantities of food for both man and beast immense distances and at great expense, from the country to the cities, and from one part of the country to another. The difficulty and expense attending these operations is very clearly illustrated in the case of our armies in the field by the immense and expensive forage trains which are necessary under the present system for supplying the men with rations and the animals with forage. So great is this difficulty that the movement of large bodies of troops is often seriously interfered with or entirely prevented for the time being. In the case of mounted men when setting out upon a lengthy expedition, and when celerity of movement is vital, and in which case heavy and cumbrous trains must be dispensed with, this difficulty becomes still greater.

Now, the object of my invention is to remedy this difficulty; and this I propose to do by so preparing the food, whether for man or beast, as that it shall be highly concentrated and rendered far more portable.

To enable others skilled in the art to make and use my concentrated food, I will proceed to describe the process and nature of my invention more in detail.

I first select those kinds of grain best suited to form the desired food. In case I wish to prepare rations for animals used in the army, I prefer to use corn, oats, and barley, in the following proportions, to wit: six measures of Indian corn, one of oats, and one of barley, as these substances, when thus mixed, form a highly nutritious compound. These ingredients I reduce to the condition of meal and bolt them sufficiently to remove the husks or exterior coating, the various kinds of grain being ground separately and mixed afterward, or, if preferred, ground together. These proportions may be varied without serious injury to the quality of the food, with the exception of the barley, the proportion of which, if materially varied, will be likely to produce fermentation in the mass, and thus impair, if it does not entirely destroy the value of the food. The first step after mixing the ingredients is to moisten the mixture. It is then put into a vessel which has been prepared with steam-connections, and steamed until thoroughly cooked. The composition is then spread over shallow metal pans and subjected to heat until the moisture is evaporated. When fire-heated air is used for this purpose care is necessary to prevent scorching. The composition is then placed in molds in quantities—such as to form cakes—each representing a United States Army ration or other definite quantity, and subjected to a heavy pressure in a hydraulic or other powerful press until reduced to the desired bulk. When taken out of the molds the cakes are placed in a heated apartment or oven until entirely desiccated. If after which it is packed in such a manner as not to absorb moisture from the atmosphere, it will keep good for a very long time.

I do not intend to confine myself to the precise compound herein described, but contemplate the addition of oil-cake or any ordinary medicated preparation; nor do I confine myself to the precise proportions described, but claim the right to vary the same without detriment to my claim; but What I do claim as my invention, and desire to secure by Letters Patent, is—

1. The process herein described of preparing, cooking, desiccating, and pressing concentrated food, substantially as set forth.

2. As a new article of food, the compound herein described—namely, a compound of corn, oats, and barley—then cooked by steam or otherwise desiccated, and pressed or unpressed.

J. H. SCHENCK.

Witnesses:
R. G. EUNSON,
C. H. STOUT.